(12) United States Patent
Dib Echeverria

(10) Patent No.: US 9,181,922 B2
(45) Date of Patent: Nov. 10, 2015

(54) MARINE ENERGY CAPTURE SYSTEM

(76) Inventor: Ivan Dib Echeverria, Santiago (CL)

( * ) Notice: Subject to any disclaimer, the term of this patent is extended or adjusted under 35 U.S.C. 154(b) by 353 days.

(21) Appl. No.: 13/639,743

(22) PCT Filed: Mar. 31, 2011

(86) PCT No.: PCT/CL2011/000024
§ 371 (c)(1),
(2), (4) Date: Dec. 20, 2012

(87) PCT Pub. No.: WO2011/123966
PCT Pub. Date: Oct. 13, 2011

(65) Prior Publication Data
US 2013/0104537 A1 May 2, 2013

(30) Foreign Application Priority Data
Apr. 5, 2010 (CL) .................................... 325-2010

(51) Int. Cl.
*F03B 13/22* (2006.01)
*F03B 13/18* (2006.01)
*F03B 13/20* (2006.01)

(52) U.S. Cl.
CPC ................ *F03B 13/22* (2013.01); *F03B 13/18* (2013.01); *F03B 13/185* (2013.01); *F03B 13/186* (2013.01); *F03B 13/1845* (2013.01); *F03B 13/20* (2013.01); *Y02E 10/38* (2013.01)

(58) Field of Classification Search
CPC ........ F03B 13/22; F03B 13/186; F03B 13/18; F03B 13/20; F03B 13/1845; F03B 13/185; Y02E 10/38
USPC .......... 60/506, 498, 497, 507, 499, 495, 500, 60/501, 640; 417/333, 331, 330; 290/53
See application file for complete search history.

(56) References Cited

U.S. PATENT DOCUMENTS

| 537,559 A | * | 4/1895 | Best ............................. 417/333 |
| 596,124 A | * | 12/1897 | Pyle et al. ....................... 60/499 |
| 692,424 A | * | 2/1902 | Burdick ......................... 417/333 |
| 771,754 A | * | 10/1904 | Torrens ........................... 60/506 |
| 880,474 A | * | 2/1908 | Allen ............................. 60/500 |
| 884,080 A | * | 4/1908 | Fallis ............................. 60/507 |
| 998,756 A | * | 7/1911 | Dean ............................. 74/422 |

(Continued)

FOREIGN PATENT DOCUMENTS

| ES | 2 291 144 A1 | 2/2008 |
| WO | WO 2007/125307 A2 | 11/2007 |
| WO | WO 2009/065178 A1 | 5/2009 |

*Primary Examiner* — Kenneth Bomberg
*Assistant Examiner* — Xiaoting Hu
(74) *Attorney, Agent, or Firm* — Fitzpatrick, Cella, Harper & Scinto

(57) ABSTRACT

A mechanism for capturing wave energy includes a structure and a set of vertical buoys with support portions for supporting the structure. The structure is rectangular and includes rails that are oriented parallel to a direction of waves of water, and a movable tank holder carriage that runs along the rails perpendicularly to the direction of the waves. The movable tank holder carriage includes buoyancy tanks for floatation, with the buoyancy tanks having faces configured to maximize contact with the water. The buoyancy tanks are encased in a structural cage attached to the movable tank holder carriage. Wheels of the buoyancy tanks run along the structural cage to keep a position of the buoyancy tanks fixed relative to a level of the water, allowing the buoyancy tanks to rise and fall with movement of the waves.

10 Claims, 8 Drawing Sheets

(56) References Cited

U.S. PATENT DOCUMENTS

| | | | | |
|---|---|---|---|---|
| 1,403,702 | A | * | 1/1922 | Melvin .................... 60/496 |
| 1,471,222 | A | * | 10/1923 | Taylor ..................... 60/496 |
| 1,647,025 | A | * | 10/1927 | Stich ....................... 60/498 |
| 1,784,424 | A | * | 12/1930 | Garwood ................. 74/132 |
| 1,816,044 | A | * | 7/1931 | Gallagher ................ 60/506 |
| 2,749,085 | A | * | 6/1956 | Searcy .................... 60/505 |
| 2,783,022 | A | * | 2/1957 | Salzer ..................... 60/505 |
| 3,959,663 | A | * | 5/1976 | Rusby ..................... 290/53 |
| 4,108,579 | A | * | 8/1978 | Martinez et al. ......... 417/333 |
| 4,184,336 | A | * | 1/1980 | Lamberti ................. 60/507 |
| 4,302,161 | A | * | 11/1981 | Berg ........................ 417/333 |
| 4,352,023 | A | * | 9/1982 | Sachs et al. ............. 290/42 |
| 4,455,824 | A | * | 6/1984 | Dabringhaus ............ 60/507 |
| 4,731,544 | A | | 3/1988 | Jones ...................... 290/53 |
| 5,882,143 | A | * | 3/1999 | Williams, Jr. ............ 405/78 |
| 6,389,810 | B1 | * | 5/2002 | Nakomcic ................ 60/502 |
| 2009/0196693 | A1 | * | 8/2009 | Kelly et al. .............. 405/195.1 |
| 2010/0043425 | A1 | | 2/2010 | Dragic ..................... 60/504 |

* cited by examiner

MARINE ENERGY CAPTURE SYSTEM

TECHNICAL FIELD OF THE INVENTION

The present invention relates to capture energy from marine and/or lacustrine waves in order to transform it into electric energy in acceptable quantities, bypassing marine variations and movements, with reasonable costs, taking advantage of the principle of Archimedes, proposing the immersion of a group of tanks, designed with a structure and weight allowing them to maintain a certain level of flotation. The tanks are installed in a structure that allows both vertical and horizontal movements, while said structure is being supported by buoys and anchored to piles of concrete allowing the containment of the horizontal movement of the same, for the purpose of avoiding any kind of impact against rocky places. The conversion of the kinetic energy produced by the interaction between ocean waves and tanks occurs through the implementation of a gear box which has the particular characteristic that, due to the movement of such tanks being linearly ascending or descending, converts the linear motion into a one direction rotary motion. This rotary motion will be advantageously used through the incorporation of an electric generator. The invention also provides additional mechanisms that allow complementary use of energy of both horizontal movements of the tanks and the eventual impacts of tanks against structures.

BACKGROUND OF THE INVENTION

It is known that the displacement and pressure of freshwater which travels from mountains to the seas, for years, has been one of the main energy sources used by man, being that due to its power and cleanliness, there is no system which can compete with it. Basically, everything that exists are canalization systems or intubation of water that moves turbine blades, and the rotation of these is finally converted into electrical energy. These freshwaters constitute a little over 1% of water available on the planet.

Due to the immensity of the sea and its water movement, constitutes a significant source of energy that has not yet been successfully exploited commercially up until now, because it is water that cannot fall much further from the level in which they lie, and all its movements despite its beauty, are very difficult to pigeonhole into a mechanical logic. These salty waters constitute approximately 97% of the totality of the planets water.

Although, there have been various strong diverse attempts to capture energy, tides, winds and marine currents have hampered any profitable energy capturing systems up until now, relegating to this century, the possibility of doing it commercially.

The purpose of this system is to propose another system, to those already existing, capable of capturing the energy of marine and/or lacustrine waves in a way to achieve three sub-objectives:
(a) That allows the energy to be captured on acceptable volumes.
(b) That allows bypassing all non-usable marine variations and movements.
(c) The level of investment and maintenance must be low, or at the least favorably comparable with the new alternative energy sources such as wind, solar, geothermal and others that try to capture from the sea, the force of the tides, of the horizontal waves or the movement of ocean currents.

Basically the present invention, delivers a solution to provide a structure that allows the floats to move in vertical and horizontal way, in order to capture the largest quantity as possible of energy from the waves.

There are several patent documents, which deliver a solution in order to achieve the energy from the sea.

The document CL 1246-1993, discloses a set of power generator, which through the movement of the sea waves achieves this, basically consisting of a modulated rigid structure that may be floating, not floating or semi-floating and a set of tanks type drums, closed and floating, supplied with wheels, engaged in the rack gear of the columns of the structure in which they are entered by the center of the tanks, with the path of the waves a coming and going movement occurs in the opposite direction between the tank and the structure, this moves the toothed wheels which through shafts, meshing gears, with or without ratchet move a steering wheel, a coupling system, a gearbox to shift velocity to finally move the rotor of an alternator or dynamo that generates electric power.

The document CL 0235-2009 describes a hydraulic device for the generation of electric power based on the thrust, allowing to increase the rate of output, being formed by a closed main tank which contains inside another closed tank which is submerged and fixed on a point of support when the main is full.

The document 1362-2005 discloses a hydraulic generator whose operation is generated by the use of the principle of Archimedes and the force of gravity, extracting energy from a turbine by the movement of the fluid contained in said generator.

The document ES 2276613 describes a unit of electricity generation through sea waves. The object of the invention proposed in this document, is the generation of electric energy from sea waves. It discloses a device that is placed on the coast and that consists of a piece that travels through the waves sliding onto inclined rails. This piece by sliding up the rails causes the generators to turn through two chains of transmission connected to two toothed wheels which transmit the rotation axes of these generators, producing electricity. When the wave retreats, the piece falls through the rails pushed by its own weight, thus generating more electricity. Arriving at the sea surface the piece remains floating waiting for another wave. An alternative to this device would be to replace generators by a device placed in the inside of the part that generates electricity when it slides along the rails.

Document EP 1384824 reports a power generator that uses the energy of the waves that has as a component a gyroscope of moment control, and that includes a floating body, a gyroscope of moment control supported by a floating body, and an electric generator connected to the driveline of rotation through a gear to increase speed. The invention described herein is characterized by the cardan of the gyroscope in rotation by the movement of the floating body, and the momentum of the energy of the waves, being all attached to a generator of energy for power generation.

WO 03/066971 document discloses a floating plant to be located in the ocean, which has cylinder of flotation, with a turbine and cones for entry of fixed section in order to enable a fluid column to move up and down and turn a turbine. The column of liquid is forced to pass through the turbine, through two sections of piston connected by piston rods. Piston sections remain standing near a pressure plate and alternately compress the liquid against both sides of the turbine, as an axis of the cylinder of flotation, which moves up and down by the movement of the wave on the surface of the ocean, through the buoyancy of the buoyancy chambers. A suspension helps to pull the turbine in downward direction. During the compression of the fluid at high pressure, this is purged to a high-pressure hydraulic system. Low fluid pressure fluid is returned during the cycle of low pressure. The upper section of the piston is open to ventilation and they can be vented to the outdoors. The rotation of the turbine is transmitted through a shaft with a gearbox and in a room of generation. The power plant is held in position by hydraulic control jets.

WO 01/92644 document discloses a machine that captures the energy and that is capable of using the upward force of the waves on a plurality of adjacent floats, in which upwards force on each float through a rocker, bearings and autorotation media is transferred to drive a drive shaft to transfer the moment to the drive shaft, which is characterized because the bearings are enclosed between rocker tubes and the drive shaft and bearings are displaced in the longitudinal direction of the drive shaft from the normal position with respect to the float.

In general, none of the prior art documents, delivers a capture solution of acceptable volumes of sea energy, enabling to ignore all variations and marine movements, not usable and of low level of investment and maintenance, providing a structure that allows the floats to move vertically and horizontally, to capture the largest number of possible energy from the waves.

SUMMARY OF THE INVENTION

As seen in the previous art, a solution has not been given to capture the energy of a wave, for both vertical and horizontal movement.

To be able to capture the vertical and horizontal movement, the present invention proposes a mechanism for capturing wave energy, consisting of a set of four vertical buoys that support the central structure. This structure is rectangular and contains parallel rails oriented towards the direction of the waves, over which runs a mobile tank holder carriage that is arranged over the rails perpendicularly to the direction of the waves and that runs along the rails parallel to the direction of the waves. The moveable tank holder carriage has at least one buoyancy tank, whose geometry presents its greater exposure towards the face that comes in contact with the water, these buoyancy tanks are encased in a structural cage, which is part of the moveable tank holder carriage, inside this cage there are running wheels that keep fixed the position of the buoyancy tanks in relation to the water level, allowing them to rise or fall with the waves. The wheels of the moveable tank holder carriage allow a short shift on the central structure, in direction to the beach. Each buoyancy tank has on its upper face one or more sword type structure commonly known as double rack gear, of vertical drive, which passes through the center of a vertical conversion box. In the same way the moveable tank holder carriage has a horizontal sword type structure commonly known as horizontal rack gear that passes through the center of a horizontal conversion box.

BRIEF DESCRIPTION OF THE DRAWINGS

The enclosed drawings, serve to provide a wider understanding of the invention, which are incorporated and form part of this description, they schematically represent the executions of the invention and together with the description allow further explanation, where.

DESCRIPTION OF THE INVENTION

The present invention concerns a system to capture the energy of the sea waves and/or lacustrine in order to transform it into electric energy in acceptable quantities, bypassing the variations and marine movements with reasonable costs.

The System Boundary Conditions

If the tides are the result of the attraction exerted by the moon on the Earth, and the marine currents are the result of temperature differences that exist in different areas of the ocean, causing movements of cold waters, to areas of higher temperature, the waves are the result of the thrust of the wind on the water, in hundreds and thousands of miles offshore.

What we see on the shore, is the end result when all the mass of agitated ocean water in huge tracts, busting on the beach reaching a few meters above the sea level and losing with the undertow and the inclined plane of the beach, all the kinetic energy that was at the time of burst near the beach. In terms of energy and the extensions involved, this process is of gigantic proportions.

Unfortunately it is very difficult to capture the energy of the waves in full form, reason why I tried to circumscribe this proposition, a mechanism that although only partially take these energies, are still large enough for self-sufficiency in economic terms, without fouling the sea, or air, without any noise pollution, without stopping any process in the movement of water, that is to say, capturing only the energy of the movement of water in order to transform it in electricity.

Figure 1:
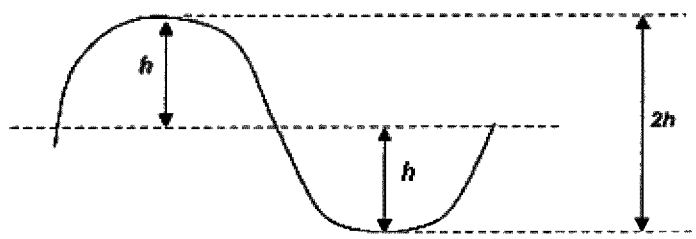
FIG. 1 is a scheme of the change of height of a wave.

For the purposes of the present invention, it is important to take into consideration:

(a) Wave height "h", or amplitude of the wave, understanding by height or width according to the graph as the height of the wave, that it must be theoretically equal to the depth of the negative part of the wave. This is shown in FIG. 1.

(b) The frequency of the waves, understood in units per minute, which experimentally we could assume in the following ranges:

TABLE

Frequency of the waves.

| CONDITION | FRECUENCY |
|---|---|
| CALM SEA | ±5 WAVES/MINUTE |
| AGITATED SEA | ±10 WAVES/MINUTE |
| SURF | ±15 WAVES/MINUTE |
| STORM | ±20 O MORE WAVES/MINUTE |

For all intents and purposes we will define this frequency with "$\mu$".

Figure 2:
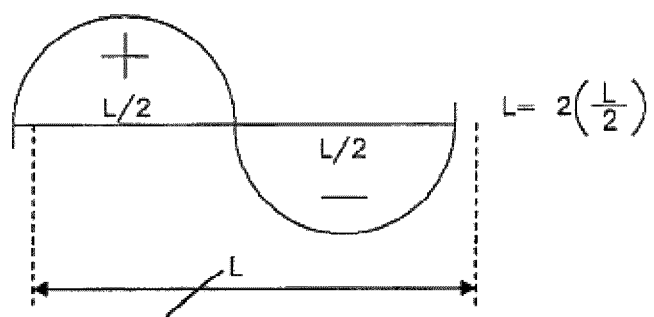
FIG. 2 is a scheme of the wavelength of the wave.

(c) Wave length: the length of the wave is equal to the sum of the distance that runs along the wave, when they have passed the two phases of the wave, positive and negative phase, as shown in FIG. 2.

(d) Wave profile: The wave has the same features of any fluid subjected to surface agitation. Any ductile material such as for example a rope of hemp or yarn that gets a boost at one end, shall transmit the impulse energy through all the rope. While you have rope the power will be transmitted in the form of two positive and negative oscillations that will run along the rope. When the string is complete, it will pick up a few inches and then it will extend again in violent form, accompanying the movement with a little click. It is the principle of the scourge.

The water of the sea before the end of its wave cycle, is also suffering an elevation of the waves, reaching its maximum expression in the area of the breaking wave, to then relieve all its energy turning the water on the same coast, or in the inclined plane of the beaches. Only in the section between the reef and the shore of the beach, the water changes its vertical movement by one purely horizontal. This form is equivalent to the end of the whip.

For the purposes of this invention, any system that seeks to maximize the capture of tidal energy must be installed in areas where wave action is at its maximum expression. This forces these systems to install near the coast, and preferably in areas where depths do not exceed the 10/20 mts. The latter, is recommended in areas of normal waves. In addition, there are areas of high seas where waves in themselves are considerable, and in this case, it is also recommended.

So we must also consider that due to the constant movement of the Moon, the breaker zone suffers permanent displacement approaching or moving away from the coast.

Therefore, any energy capture system 24 hours a day, that seeks to be efficient, must consider the capture of vertical thrust vectors, and the horizontal vectors of water that occur after the break, or as a result of the tides and currents.

Well, the same tides product is necessary to consider that when the tide drops or rises, by its only effect a considerable mass of water is moving in one way or the other, and this also generates pressure differentials that mobilize flows of water in one sense or another, also in the horizontally moving away or closer to the coast.

Finally and to a much lesser extent, shallower waters are most vulnerable to the heat exchange with the atmosphere, and therefore in the area near the coast occur gradients of temperature that alter the density of water, and thus movement of cold water to areas of water hotter and less dense. Any of these currents can have its horizontal expression and may add to the movement of horizontal vectors.

(e) energy principles: as a general principle, the energy is constant, only transformed.

If the force of the wind miles and miles prints a tumbling into the sea, and therefore energy, this energy is transformed into waves, and when reaching the shore the power that manages to raise a body of water in the form of a wave, of 2, 3 or more meters above the sea level, that amount of power is quantifiable, because the height of the wave, the shape of the wave and the density of water give quite a quantifiable value and is in principle very similar to the energy that is released when that same mass of water collapses in the sand on the beach or hit some rocks and climbs inland until it exhausts all his movement.

Principles and Conditions of the Proposed System

The principle of Archimedes gave a response as to why boats and certain objects float while others do not. To briefly summarize this principle, it states that any object thrown into the water, receives a vertical force from the sea towards the sky equivalent to the weight of the volume of water displaced. That is to say, if I put a hull buoy that displaces 100 m3, the thrust that receives this hull in order to float is equivalent to the weight of 100 m3. If we assume that 1 liter of fresh water is 1 dm3 and this weighs 1 kg, then 1 m3 has 1000 dm3 or 1000 liters, and 100 m3 have 100,000 dm3 or liters and its weight is 100,000×1 kg, i.e. 100,000 kgs or 100 tn, a significant amount of strength.

First Condition:

Thus, also placing within this hull or floating tank, load, ballast or whatever, this hull does have movement in the water when it travels down from the upper level of the wave towards the lower part of the wave, the strength to which applies downwards is approximately equivalent to the weight of the hull, plus the weight of the ballast.

Then if we in a closed tank or pond, position such a quantity of ballast that added to the weight of the tank, we got a balance between the net buoyancy force upwards, and the ballast weight plus the weight of the tank downwards, then under any movement that we were to have in the water, the buoyancy force upwards would be equivalent to the fall of the tank when the wave lowers according to:

$$E=2 \cdot (P\&L), \quad (1)$$

where E=total maximum buoyancy of the volume of the tank; P=tank weight; and L=ballast weight.

This concept is key to understanding everything that comes, since we have an element to push up and down with approximately the same strength that allows simplifying our mechanisms. Strictly speaking this assertion is not accurate because it should be deducting scrapes and pressures of water on the floating object. These negative forces will be considered when we come to final conclusions.

In this way if we can manufacture an airtight tank with ballast perfectly balanced with a total volume "V" for example equivalent to about 50 m3, we are talking about approximately an equivalent to 25 tn push which is not negligible with a device equivalent to a large container.

Second Condition

Unlike what happens in the hull of a boat or with the design of a torpedo or submarine, the buoyancy tanks proposed by us must be very flat, wide and long in their hull.

This statement comes from the practical test from the laboratory that demonstrated that being the tank as previously described, any movement of the water translates into an immersion or transient emersion involving much volume of displaced water, since the water contact with the surface is large, any immersion of the tank no matter how small it may be, involves a large volume of water and that is the thrust that we're looking for.

Third Condition

Also, since the navigation of ships recommends to face waves perpendicular in order to prevent tip-overs of the ship among other things, in our case the recommendation is exactly the opposite, that is to say, it is ideally recommended to face the wave sideways in order to have a greater effect on the tank, and thus take advantage to the maximum the movement of the waves.

Fourth Condition

In a sea or ocean with visible waves, the waves may have smaller or taller height, and higher or lower wavelength. For the purposes of our tanks what is of most interest is that its width must not exceed the wave base, and contrary, if possible, should be less than the wave base. The reason to this is that if a tank due to its width is suspended by the vertical thrust of two waves in two extreme points, all of the effort in making it go upwards to later go down, would be neutralized.

Fifth Condition

The height of the waves is greater as approaching the inclined plane of the seabed of the littoral. This makes it advisable for the tanks to get closer as much as possible to the shores, where the waves are at its highest. Now due to the movement of the tides, the breaking of the wave moves depending on the tide, this last statement is very important for the purposes of the relevant vectors of the wave, since before the breaking of the wave, the main vector is the vertical vector, and after the breaking of the wave, the main vector is the horizontal vector. For the purposes of the design, our team is enabled to capture both the horizontal and the vertical vector.

Sixth Condition

The principle proposed in general lies in taking advantage of the work carried out by a few floating tanks with respect to a fixed structure that holds them. To keep the fixed structure fixed, it must be anchored to the seabed, when the depth permits this. When an anchor to the seabed is not possible, one should find the relative difference of the weight and size of the floating structure making it so much greater, that the thrust of small tanks does not alter the stability of the supporting structure.

For the purposes of performance and stability of the system, the ideal is that it is supported on concrete piles fixed to the seabed.

For purposes of economy of Assembly, transport and then anchor, it is best to float the structure in vertical buoys, which are then anchored to the seabed.

Seventh Condition

Since the sea is an inexhaustible source of climate instability, what is recommended is to allow the vertical buoys to use as ballast sea water to lift its height, if necessary. On the other hand, it is also necessary that the buoyancy tanks must be easily lifted out of the water if necessary, either by a storm or for maintenance.

Definitions of the Capture of Energy

If we are in a system that floats on the sea, which has a total weight equivalent to the buoyancy that receives from the water, we are dealing with a mechanical system that oscillates vertically with different heights and depths, since waves rise and fall in uncontrollable forms, however, we can establish that we are dealing with a large piston that rises with strength and falls with strength, but by not having similar nor controllable routes, we cannot incorporate within the characteristics of a motor of simple combustion.

Hence, a way of controlling this is using bearing systems to rotate freely in one direction, and in the other direction being obstructed transferring all the strength into the body in which they are embedded.

Figure 3:
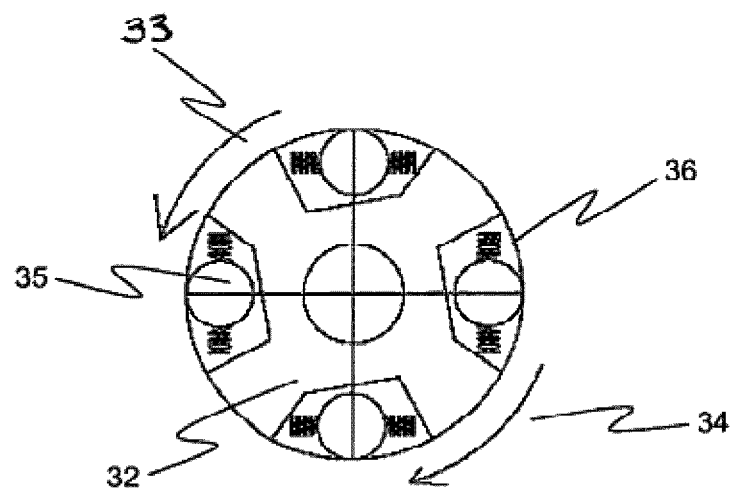
FIG. 3 is a box that converts the ascending and descending linear motion into a rotary motion.
Figure 4:
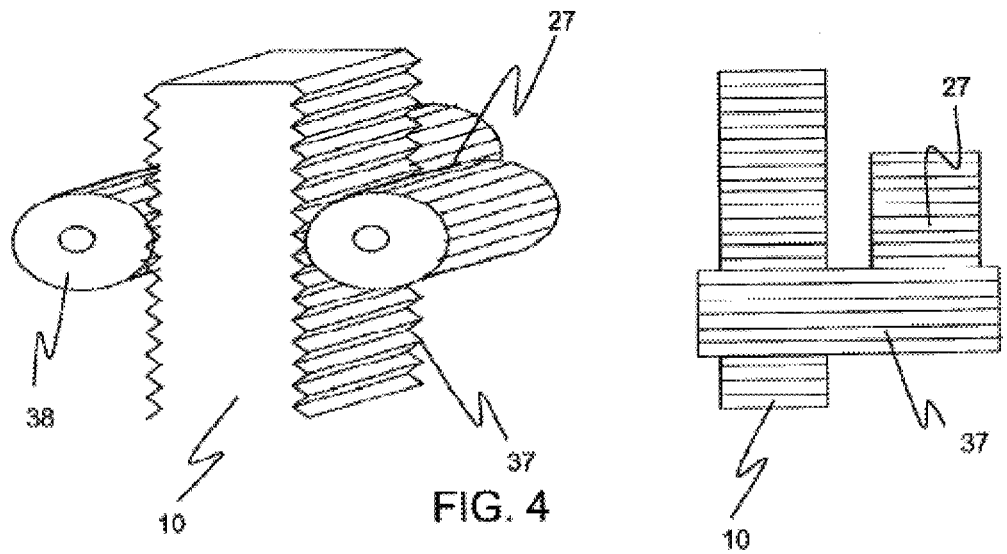
FIG. 4 is a perspective and elevation of the double rack gear and the transmission gears.
Figures 5, 6:
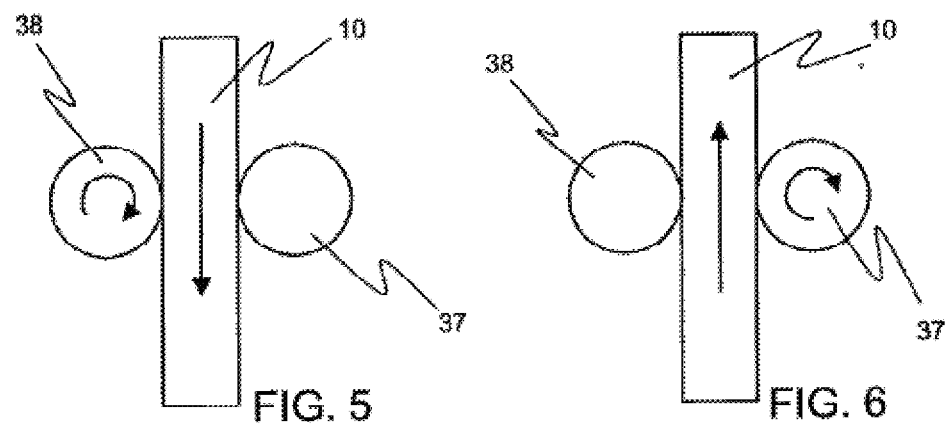
FIG. 5 is a scheme of the rack gear and gears on the descent of a wave.
FIG. 6 is a scheme of the rack gear and gears on the rise of a wave.
Figures 7, 8:
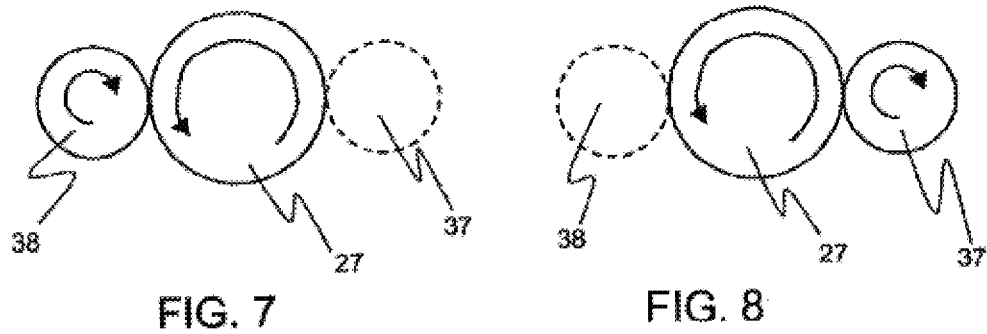
FIG. 7 is a scheme of the movement conversion box, of linear double direction to unique continuous rotation when the wave lowers.
FIG. 8 is the same as the previous scheme, when the wave rises.

As shown in FIG. 3, the problem lies in designing a gearbox with gears and ratchet type bearings (32) that transform the upward vertical movement (straight) into a rotating movement in one direction, and the downward vertical movement (straight) in a rotating movement in the same direction. In this condition, said ratchet bearing (32) possesses a free direction rotation (34), a sense of hindering (33), using rollers (35) and springs (36).

To accomplish this, as shown in FIGS. 4, 5, 6, 7 and 8, it is intended to make a two-edged sword type structure or double rack gear (10), in which each edge has teeth of gears, which in turn act according to whether the floating body goes up or down. The rack gear (10) has on both sides two rotating gear transmission (37) and (38) that rotate free or locked because it use the ratchet bearing, and a gear with only one direction of rotation called pinion of attack (27).

Both gears (37) and (38) have inside bearings of a single direction, and conversely placed, so that when the double rack gear (10) goes up (FIG. 6) moves a gear (37) with force, while the other (38) gear rotates in band, and when movement is reversed (FIG. 5) by the low tide, then activates the gear on the other side by turning with strength the gear in the same direction (FIGS. 7 and 8) thus generating a permanent move in the same direction of rotation, and that does not depend on the accuracy of the height of the wave.

Now if $\mu$ is the frequency of the waves [wave/min], total linear travel that will suffer the rack gear and therefore the distance of work would be about the height of the rise of the tank plus the distance when it goes down, and if this height is equal to the height of the wave (or at least one portion of it), then the total travel of the rack gear would be:

$$d = 2 \cdot \alpha \cdot h, \qquad (2)$$

where h is the height of the wave and a is the coefficient of loss of height by sinking of the tank. Now as this occurs several times per minute g times then at linear working velocity ż would be:

$$\dot{z} = 2 \cdot \alpha \cdot \mu \cdot h \text{ [mts/min]}. \qquad (3)$$

Now this linear speed is transformed into rotary movement, and to get to know the rotation speed this linear velocity is divided by the primitive perimeter of the gear that is spinning. So if n is the number of revolutions per minute the equation is:

$$n = \dot{z}/(\pi \cdot D), \qquad (4)$$

where D is the primitive diameter of the gear. But as speed ż is defined by the Equation (3), then $$n = (2 \cdot \mu \cdot \alpha \cdot h)/(\pi \cdot D). \qquad (5)$$

In this equation the relationship is set to the number of revolutions per minute we can get from the system, according to the primitive diameter of the active gear, the frequency of waves, height of these and the coefficient of sinking of the tank.

Now as in any active gear, the greater or lesser torque of it, is measured in the product of the tangential force, multiplied by the radius of the gear, i.e. D/2, and on the other hand to move a standard electrical alternator on the market, it must achieve rotations close to 1.000/1.200 rpm, then all we need are very low primitive diameters in the gear or gears of active attack to get a rotation as high as possible.

This poses many problems in the active gear or gears, which are subjected to forces of tons, and must concentrate all that strength on gear teeth as small as possible.

Now as the vertical force of the weight down is practically equal to the push up, then the torque on the gear can be set depending on the buoyancy and this on the volume of the tank:

$$T = F \cdot r = (V/2 \cdot \rho) \cdot D/2 = (\rho \cdot V \cdot D)/4, \qquad (6)$$

where T is the torque in the gear, F is the buoyancy force, r is the radius of the gear, V is the volume of the tank, $\rho$ is the density of the water equivalent to 1000 [Kg/m^3]=[(10)]^3 [Kg/m^3] and D is the diameter measured in meters.

Thus, $$T = V/2 \cdot [(10)]^3 \cdot D/2 = (V \cdot D \cdot [(10)]^3)/4 \; [Kg \cdot mt], \quad (7)$$

which tells us, that the torque of the active gear is a direct function of the volume of the tank.

Now we apply the equation that relates the power of an engine with the movement of a gear applied over a straight rack gear, which is the same the other way around, if we move the rack gear and activate an alternator:

$$\text{Equivalent power in kw} = P = (T \cdot n)/974 \; [kW]. \quad (8)$$

Replacing the expressions of the equation (7) torque and number of revolutions equation (4) made earlier and replacing them in equation (8), and replacing the expressions of the equation (7) torque and speed equation (5) made earlier and replacing them in equation (8), yield the following expressions:

$$P = \frac{\left(\frac{V \cdot D \cdot 10^3}{4} \cdot \frac{2 \cdot \mu \cdot \alpha \cdot h}{\pi \cdot D}\right)}{974} = \frac{\alpha \cdot V \cdot \mu \cdot h \cdot 10^3}{2 \cdot \pi \cdot 974} [kW] \quad (9)$$

$$P = \alpha \cdot V \cdot h \cdot \mu ([10]^{\wedge}3/(2 \cdot \pi \cdot 974)) \quad (10)$$
$$= 0.1634 \cdot \alpha \cdot V \cdot h \cdot \mu [kW]$$

$$kw = \alpha V h \cdot \mu \cdot (0.1634), \quad (11)$$

in which:
kw=power in kw
V=volume in tank m3
h=height of the wave in mt
μ=number of waves per minute
a=coefficient of sinking (from 0 to 1).

This formula determines the vertical power of the equipment, which depends proportionally on the volume of the tank, the height of the wave and the frequency of these. The α coefficient will be experimental and will depend on the design of the tank or tanks, as well as their weight.

Our initial findings are that if we are able to lift the tank by 1 mt., and then sink it another meter, which is not a great thing in an area of open waves (αh=1), with a frequency of rough sea of 10 waves/min with a tank of about 40 m3, we can get a power of:

$$kw = 40 \; m3 \cdot 10 \cdot 0.1634 = 65.36 \; kw.$$

Considering that we can have a 40% loss in transmissions, we are talking 35 kw.

Case Conversion

The case conversion of linear movement up and down (6) into two straight linear directions, captures the linear movement of the wave and transfers it to the pinion of attack (27) through the double rack gear (10). The attack (27) pinion gear meets with another set of dented wheels, which finally transmit the rotary movement to an inert wheel and the latter through a flexible coupling to the generator shaft.

The Cross Movement

As noted above, the vertical movement of the wave is the one with more force and for this reason is that it has been sought in this solution as the best way to exploit its energy transfer from the sea, however, to the extent that the bottom of the sea floor lowers in depth, the horizontal component in the sense that the shore is becoming ever more noticeable.

Not having any sustain, to the extent that the bottom of the beach tapers, the crest of the wave is left without a base of support and finally bursts overturning all the weight of its upper crest, in a horizontal movement of ocean to land that raises the water a few meters above the sea level, to then backup as a rip tide.

This horizontal wave vector is the cause of all the spoils of bottles, tables, algae, and all kinds of floating objects that throws the sea on the beach.

For our team this component is less important than the upright but non-negligible, and would not be justified as an energy source by itself, but if we are already framed in a supporting metal structure, it appears that any additional effort that is made, with minor mechanical modifications can have fruits of improvement in the global use of energy.

In short, what matters is to raise our tank with all its mass on a rolling cart that moves in the same direction perpendicular to the coast, where its space of displacement does not exceed 1 wave length, and where the tank plus its ballast have the possibility to oscillate, using its buoyancy, the horizontal forces of the waves, and springs that cushion the blows and at the same time facilitate the floating tank pitching.

When we describe the conditions of the system's edge, we define the tides and the currents as permanent sources of horizontal vectors, which always move any object floating in the sea.

Now the wave itself does not produce unidirectional horizontal movements, to the extent that we are away from the coast, because it produces only a pendulum movement depending on the height of the wave. This pendulum movement explains graphically in the following way.

Figure 9:
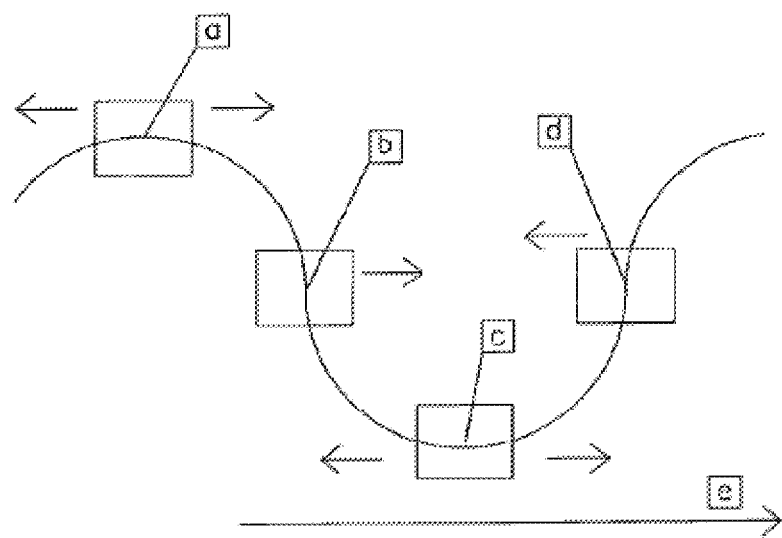
FIG. 9 is an outline of a wave and the buoyancy tank, floating above it, in different positions.

In FIG. 9 are 4 objects floating in four positions of the wave. The "a" position is at the top of the wave, both lateral sides are in the air and therefore there are no forces that promote the object to any side, are in balance.

Similar to the above, in the position "c", in which the object is flanked on both sides by equal amount of water, so also are in balance.

In the "b" position the object is flanked on one side with water, in the other only air, the object comes in a fall and pushing towards the coast. View direction of the wave "e".

In the "d" position, the process is exactly opposite, the wave went by and the object is going uphill, and returning because of a wall of water that overtakes it.

The result of this process, in which waves pass, is that the floating object receives a force in one direction, and then again in the exact opposite direction, almost of equal magnitude. This is exactly the process of a pendulum, and minimum which is even at plain open sea, this movement has a horizontal component that can be used.

To quantify this movement, the work performed by the tank to push through their exposed faces to the waves must be recognized.

By definition if an object is submerged totally or partially, it receives a pressure that exists at that depth. That pressure multiplied by the area where it is applied is equal to the force that receives that face of the object in question.

Figure 10:
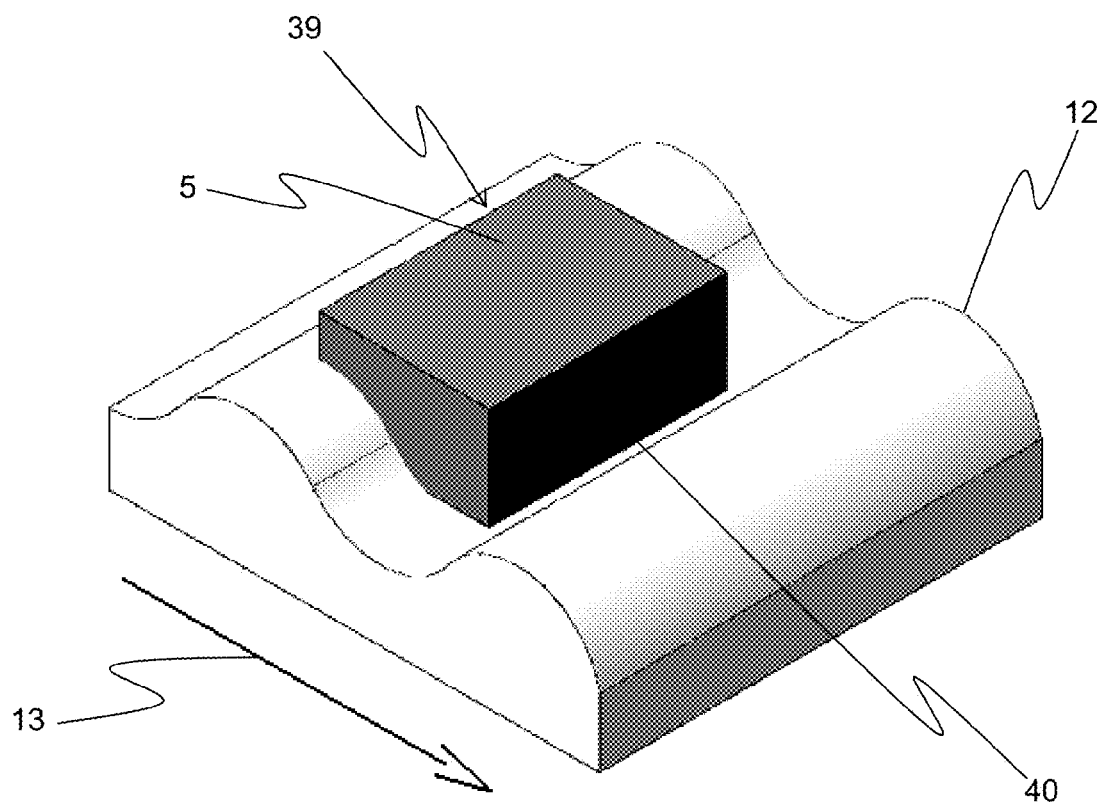
FIG. 10 is a perspective of a wave and buoyancy tank, floating above it.

As shown in FIG. 10, is defined that buoyancy tanks (5) should have flat faces exposed to the waves (39) and (40) rip tides, where the waves have a profile (12) and a movement in a direction of advance (13).

Therefore the two faces exposed to the waves whose surface is "A" receive a force "F" equivalent to the product of the water pressure at that point multiplied by the area of the face of the tank where that pressure is acting:

$$F = P \cdot A. \quad (12)$$

The pressure in every point of a liquid is equivalent to the specific weight of the liquid:

$$P = \rho \cdot a, \quad (13)$$

with "ρ" being multiplied by the column of liquid which exceeds the point where pressure is being measured.

At sea the specific water weight is close to 1 kg/dm3 of water, therefore 1.000 kg/m3. Then our pressure equation becomes:

$$\frac{P}{10^6} = \frac{1000}{10^4} \times Kg/m^3 \times a \qquad (14)$$

$$a = cms$$

$$P = Kg/cm^3,$$

since 1 m3=100×100×100 cm=1.000.000 cm3.

If on the top of the wave the tank does not practically receive any lateral impulse, when this tank is arriving to the lowest part of the wave, it is receiving all of the weight of the water column that's overflowing the tank. For a gross approach, we could consider that on average the tank will receive the pressure that exists in the centre of the mass of the wave, meaning:

$$\frac{P}{10^6} = \frac{1000}{10^4} \times (h/3) \times 2, \qquad (15)$$

where h is the height of the wave that surpasses the sea level measured in centimeters and "a" is=⅔ parts of the height of the wave (mass center).

In a swell where h is 50 cms, we are talking about a pressure of:

$$\frac{P}{10^6} = \frac{1000}{10^4} \times 50/3 \times \frac{2}{3} = \frac{1000}{10^4} \times 0,167 = 0,0167. \qquad (16)$$

If the face of a tank is 3 mts in height by 6 mts of length, by 3 mts of width (54 m3), we are talking about a medium strength of [600×(150+50)](A)×0.0333 kg/cm2(P)=3996 kg.

If the tank has half the volume submerged under water, for necessary condition, still its vertical thrust is:

$$\frac{54 \ m^3}{2} \times 1.000 \ Kg/m^3 = 27.000 \ Kg. \qquad (17)$$

This is close to 7 times more than what is achieved laterally.

However, while the thrust works in function of the height of the wave, in this case the work is measured by multiplying the strength of the displacement by the distance reached by what the tank travels.

In an ideal situation this distance should be equivalent to the longitude of the wave, but in practice the product of water viscosity, the inertia of the mechanisms, the plane designs of the faces and copiousness, this value is very much less.

With everything and taking very conservatively the values that we will need to empirically quantify later, we could assume that the oscillation of a body in the sea with this flat design could bring about a 7/10% of the energy provided by the vertical vector, i.e. without considering the tides or currents.

This value could considerably improve the efficiency of our team.

Figure 11:
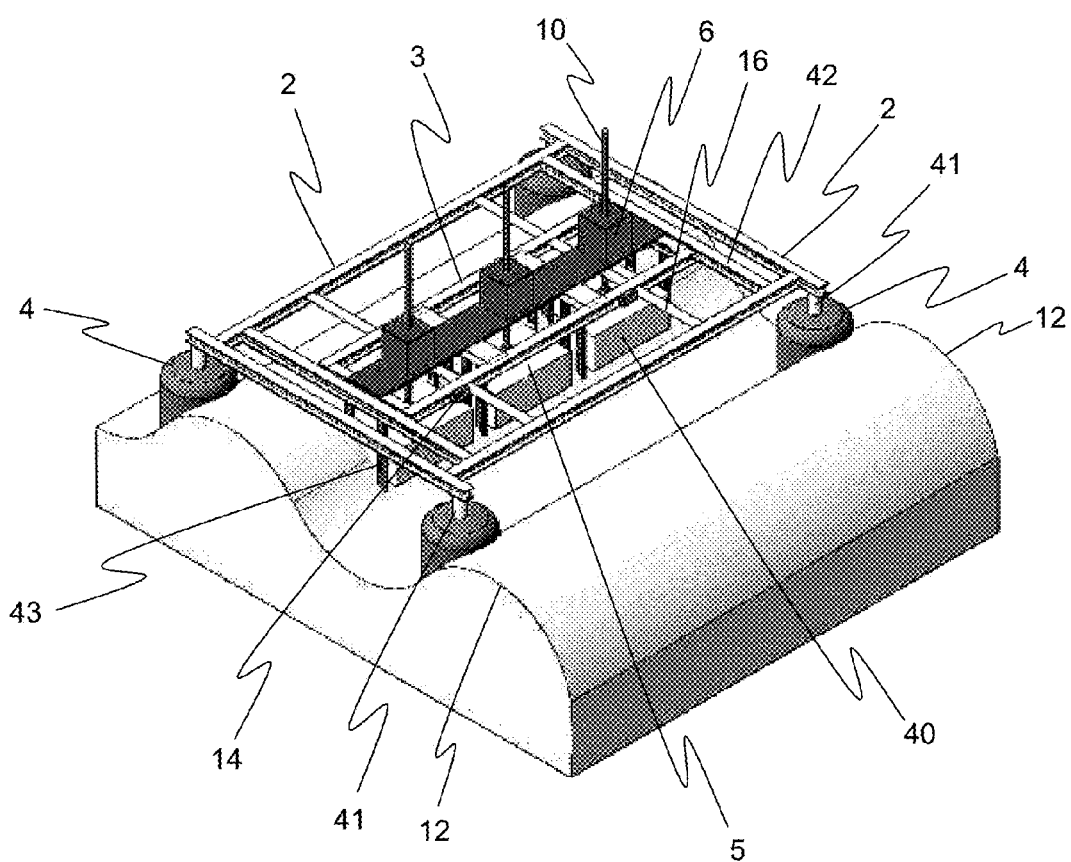
FIG. 11 is a perspective of the mechanism for the capture of energy from the waves of the present invention.

FIG. 11 shows a global view of the mechanism where 4 vertical buoys (4) that have four bases of support (41) that sustain a rectangular structure (2). This rectangular structure (2) has two rails (42) oriented parallel to the direction of the waves, where runs a tank holder carriage (3) parallel to the direction of the waves. From this movable tank holder carriage, at least one buoyancy tank (5), whose shape is faces parallel, flat, presenting its largest possible exposure in the face that contacts with the water.

The buoyancy tanks (5) are boxed by a structural cage (43) by where wheels that keep fixed the position of the tanks in relation to the water level run. The structural cage (43) at the same time allows the tanks going up or down with the waves.

By using the wheels (19) (FIG. 14) to run on the cage (43) the at least one buoyancy tank (5) is allowed to move up and down, and by using the wheels (25) of the tank holder carriage (3) to run on the rails (42), the at least one tank (5) approaches or moves away from the beach.

Before or after the breakwaters, having high or low tide, currents flows from the beach inward, or opposite, with greater or lesser waves the buoyancy tank has all the movements in two dimensions where there is pendulum movement.

Figure 12:
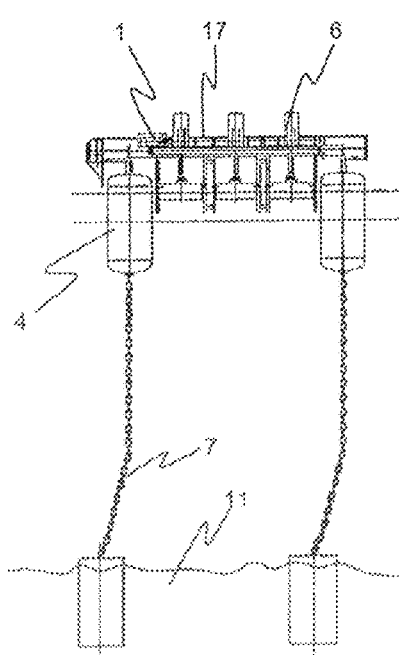
FIG. 12 is a front view of the plant from FIG. 11.
Figure 13:
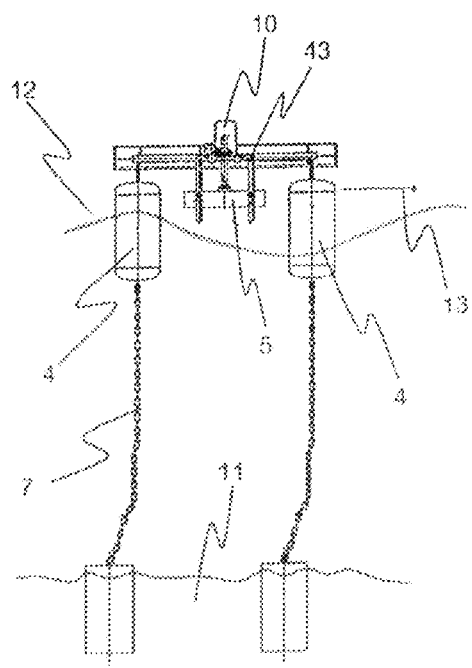
FIG. 13 is a side view of the plant from FIG. 11.

Referring to FIGS. 12 and 13, showing the position of a set (1) of the 4 buoys (4), anchored to the sea bottom (11), united by a chain (7). In case that it is not possible to be fixed to the bottom (by depth or dangerousness) optionally can be launched a weighing anchor. The function of these buoys (4) together, is to give stability to the supporting structure (2), and therefore its distance must not exceed half the wavelength of the wave (44), or L/2 shown in FIG. 2, and its weight and joint thrust must exceed the thrust and maximum weight of the buoyancy tanks (5) that are inside, be the movement in one way or another. As will be appreciated, in the embodiment shown in FIG. 2 the distance must not exceed L/2; however, in other embodiments the distance need not be so limited.

Each buoyancy tank (5) has on its upper face one or more double rack gear (10) of vertical drive, which passes through the center of a box of vertical conversion (6), whose function is to transform the movements up and down into a single unidirectional rotary movement (27).

In another side view (FIG. 13) are shown buoyancy tanks (5) lined up and hanging from the structural framework of the tank holder carriage (3).

Figure 14:
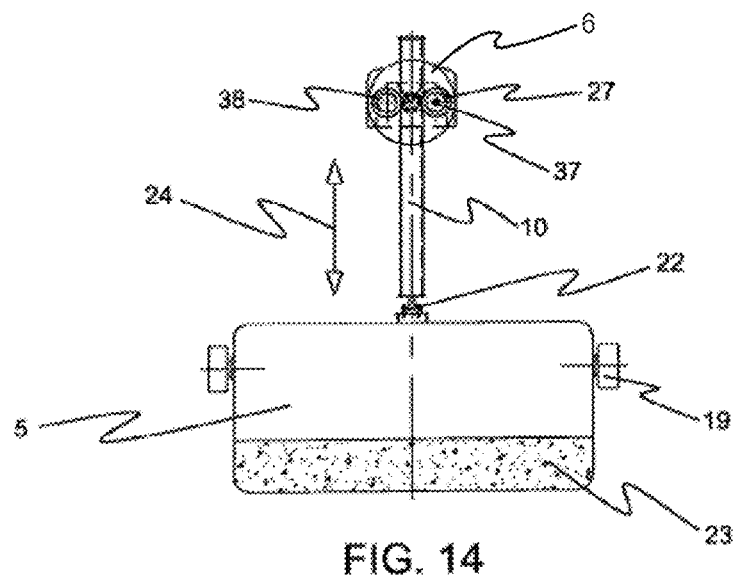
FIG. 14 is a cross-section of the buoyancy tank, with a double rack gear and a pair of directional gears.

FIG. 14 shows a cross-section of the buoyancy tank (5), which shows the pair of directional gear (37) and (38), the unidirectional sprocket (27), the vertical movement (24), the ballast (23) that contains in its bottom to balance the weight and thrust, this ballast (23) must be fixed, kept at the bottom and with the variations of the waves must remain static. It is also advisable to be chemically stable, and especially not alterable with salt water. Preferably it should be some kind of concrete.

Also shown is the elbow joint (22) between the buoyancy tank (5) and the double rack gear (10), in which the union should be spherical and allow a soft game that will occur between the tank (5) and the rack gear (10).

Then in more detail you can see, the double rack gear (10) with its large vertical movement going back and forth through the center of the conversion box (6). Inside the box, inert wheel, shafts, bearings, gears and a variety of mechanisms, transform the incessant movement of come and go of the waves, into a rotary movement of large torque and low rotation in one direction of the rotation.

Figure 15:
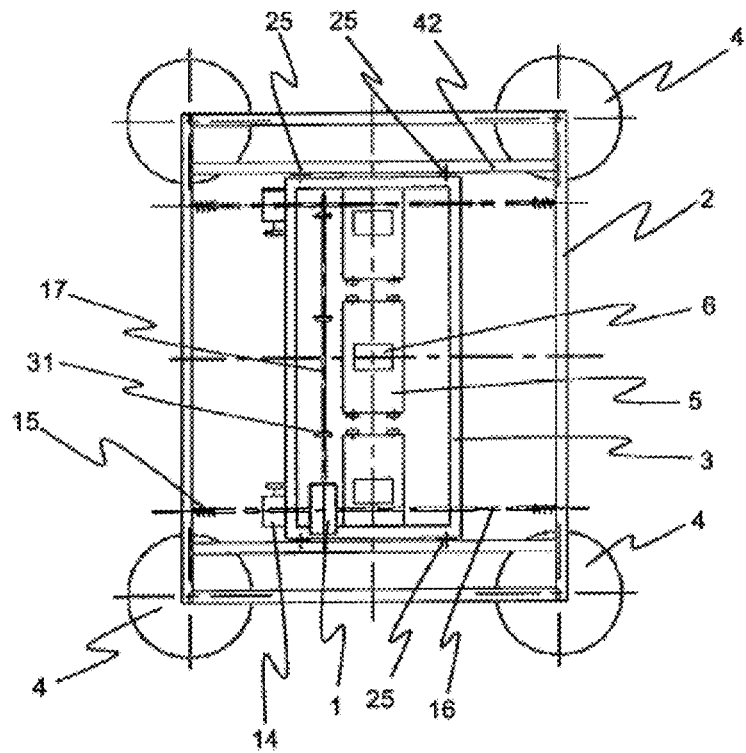
FIG. 15 is a view on floor of the mechanism of the present invention.
Figure 16:
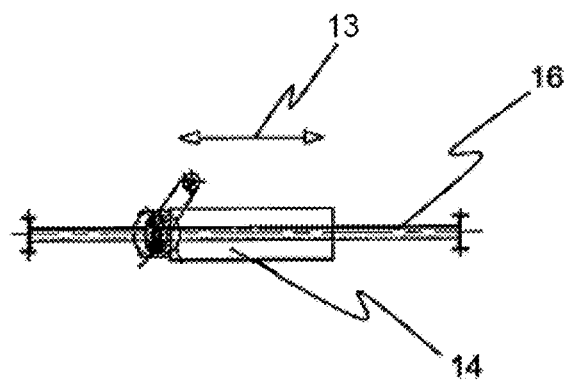
FIG. 16 shows a horizontal rack gear, which captures the horizontal movement of the wave, on the mechanism of the present invention.

In FIGS. 15 and 16, the 4 buoys (4) of support are represented from the top, the supporting structure (2), the frame of the tank holder carriage (3), the buoyancy tanks (5), the vertical conversion box (6) and the horizontal conversion box (14). Also a horizontal rack gear can be seen (16) fixed to the frame bracket (2).

As well as the direction of the waves (13), hit laterally, the tanks (5) will retain the pendulum oscillation of them, and that will displace the carriage (3) in one or another direction, transferring all the power to the horizontal rack gear (16) which in turn transmits to the horizontal convertor box (14), all horizontal movement that is one-way or return and by turning it in a single direction. This rotary movement is picked up directly and will be transmitted by belt type V or chain to cardan shaft (17), transmitting the whole rotation vertical conversion (6) boxes and horizontal (14), directly or through an inert wheel cardan shaft (31) to the generator of the set (1).

To avoid being stuck in a single side, in case small streams or persistent tides appear, we have considered installing shock absorber springs (15) that will keep away the carriage from the shores, forcing the system to enter in oscillatory cycles (flipper effect). To quantify both forms of drive, vertical as horizontal seems relatively easy, which does not mean that the behavior of the tanks have to be linearly accurate with these forces.

It is clear from the preliminary design of the tanks (5), that we will find many mechanical resistance, friction, viscosity, inertia that will undermine the efficient operation. Nevertheless, the team as a whole as opposed to what is known to date, offers to rescue the vertical and horizontal vectors of the waves, no matter if the breaking wave, moves, or if we are in the middle of the ocean.

Therefore to arrive at the generation of electricity will have to opt for reaching rotations of the order of 1. 200 rpm with low torque, or alternatively reach rotations of the order of 150 rpm to get to a generator of many poles with low rotation and high torque.

In the first of the cases, we have found practically that transmission losses are significant. The latter we have not yet experienced it.

It has been studied the waves as a natural phenomenon of waves, with irregularities caused by a large list of causes, we have proposed to use mainly the vertical component of its movement by being this component where the mechanical theory gives us a very powerful component. To be able to transform ascending and descending completely irregular movements in a single rotary movement more or less stable, we have sidestepped all the disadvantages of the differences in height, frequency and infinite variables that this reality presents.

This energy source is very positive, for being clean, quiet, constant in time, does not suffer great changes during the day due to the changing temperature or time of day or night.

On the other hand, as a complement, we have incorporated pitching suffered by any floating object, when it is exposed to the waves in the sea. This pitch, small that may be, its status as oscillatory movement, allows it to complement the electric generation with small additional contributions, if the conditions warrant it.

The third important conclusion that this invention provides is that you can make all this mechanism of energy acquisition, with tanks, metal structures, boxes of speed, and a standard type alternator, which is achieved at costs close to the electricity generation with fresh water which falls from mountains to sea, with two major differences: first that investment amounts to achieve the same levels of cost are very inferior to this equipment with waves, since the minimum units, do not need large retaining walls, artificial lakes, which now cost hundreds of thousands of dollars to be economically justified and secondly that places with technology to economically exploit our waves are everywhere, in huge and extensive quantities, while the hydric fresh water is increasingly scarce, and increasingly more fought against from urban or rural communities as the case may be.

In synthesis, when facing a solution with low investment costs and minor operation cost and on the other hand, with great areas available for application, we are in the presence of a solution with enormous development potential.

The invention claimed is:

1. A mechanism for capturing wave energy, the mechanism comprising:
    a structure; and
    a set of vertical buoys with support portions for supporting the structure, the set of vertical buoys being structured to be deployed at a surface region of a body of water,
    wherein the structure is rectangular and includes:
        two rails that are oriented parallel to a direction of waves in the water, and
        a movable tank holder carriage arranged over the rails perpendicularly to the direction of the waves and that runs along the rails parallel to the direction of the waves,
    wherein the movable tank holder carriage includes a plurality of buoyancy tanks for floatation, the buoyancy tanks having faces configured to maximize contact with the water,
    wherein the buoyancy tanks are encased in a structural cage attached to the movable tank holder carriage, and
    wherein the buoyancy tanks include wheels that run along the structural cage to keep a position of the buoyancy tanks fixed relative to a level of the water, allowing the buoyancy tanks to rise and fall with movement of the waves.

2. A mechanism for capturing wave energy according to claim 1,
    wherein the wheels of the buoyancy tanks allow each of the buoyancy tanks to move up and down relative to the structural cage, and
    wherein each of the buoyancy tanks is arranged to approach or move away from a beach, using the movable tank holder carriage.

3. A mechanism for capturing wave energy, according to claim 1, wherein the vertical buoys are anchored to a seabed and linked using a chain.

4. A mechanism for capturing wave energy, according to claim 1, wherein the vertical buoys are maintained fixed due to a weight of at least one anchor.

5. A mechanism for capturing wave energy, according to claim 1, wherein the vertical buoys are separated by a distance that does not exceed half of a wavelength of a wave.

6. A mechanism for capturing wave energy, according to claim 1, wherein a weight and thrust or buoyancy of the vertical buoys in sum exceed a maximum weight and thrust or buoyancy of the buoyancy tanks in sum.

7. A mechanism for capturing wave energy, according to claim 1, wherein each of the buoyancy tanks includes on an upper face thereof one or more vertical rack gears, and wherein the structure includes a vertical conversion box arranged such that the one or more vertical rack gears pass through a center of the vertical conversion box, the vertical conversion box being structured to transform vertical movements into a rotary movement.

8. A mechanism for capturing wave energy, according to claim 1, wherein the movable tank holder carriage includes a horizontal rack gear, and wherein the structure includes a horizontal conversion box arranged such that the horizontal rack gear passes through a center of the horizontal conversion box, the horizontal conversion box being structured to transform horizontal movements into a rotary movement.

9. A mechanism for capturing wave energy, according to claim 1, wherein each of the buoyancy tanks includes a ballast at a bottom portion thereof to balance a weight and thrust or buoyancy of the buoyancy tanks.

10. A mechanism for capturing wave energy, according to claim 1, wherein each of the buoyancy tanks includes a vertical rack gear attached thereto by an elbow joint.

* * * * *